June 8, 1971     W. A. VON LERSNER ET AL     3,583,023
APPARATUS FOR STRIPPING CASING FROM MINIATURE FRANKFURTERS
Filed Jan. 7, 1969     3 Sheets-Sheet 1

INVENTORS:
WOLF A. VON LERSNER
BY EDGAR F. BROWN
Howson & Howson
ATTYS.

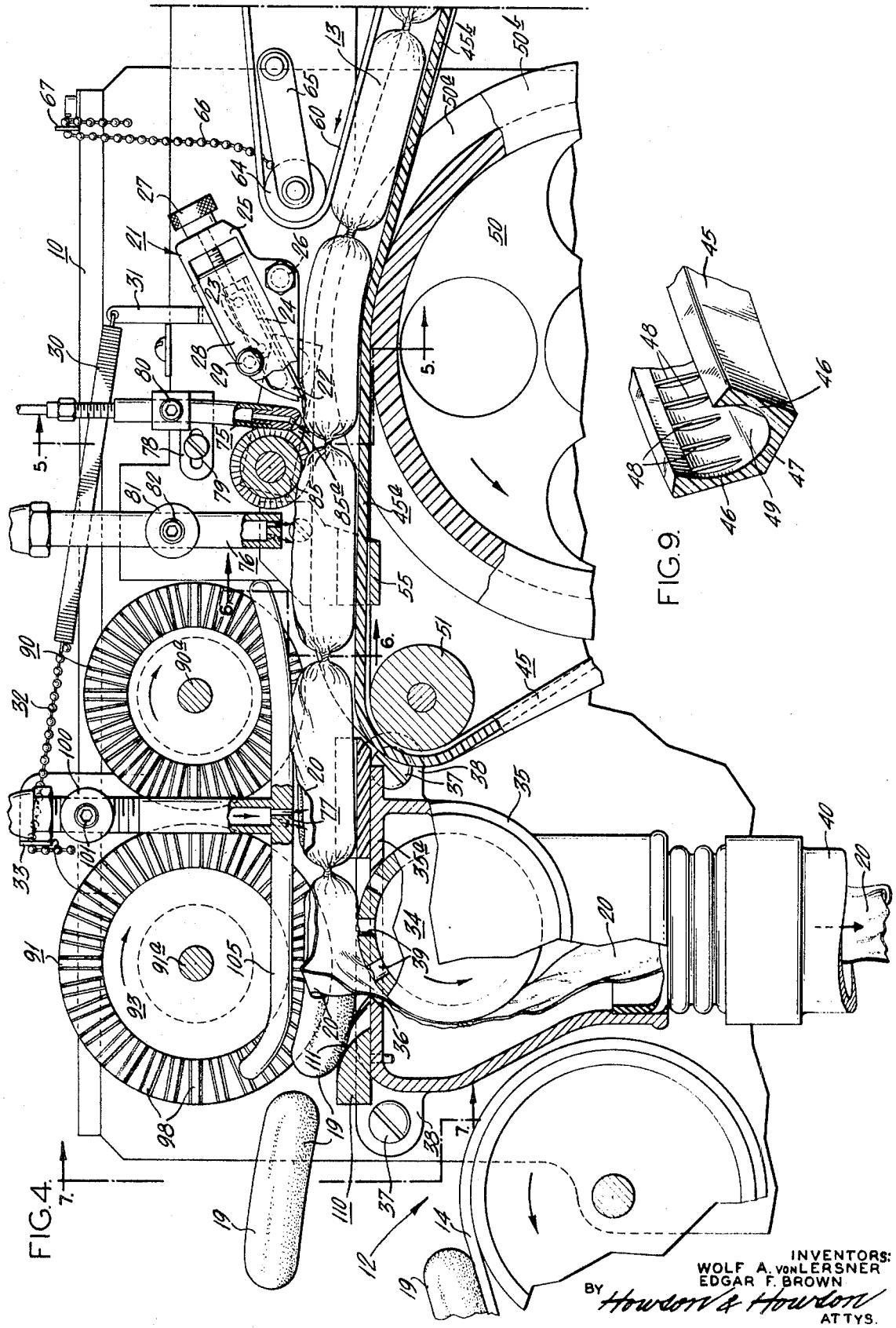

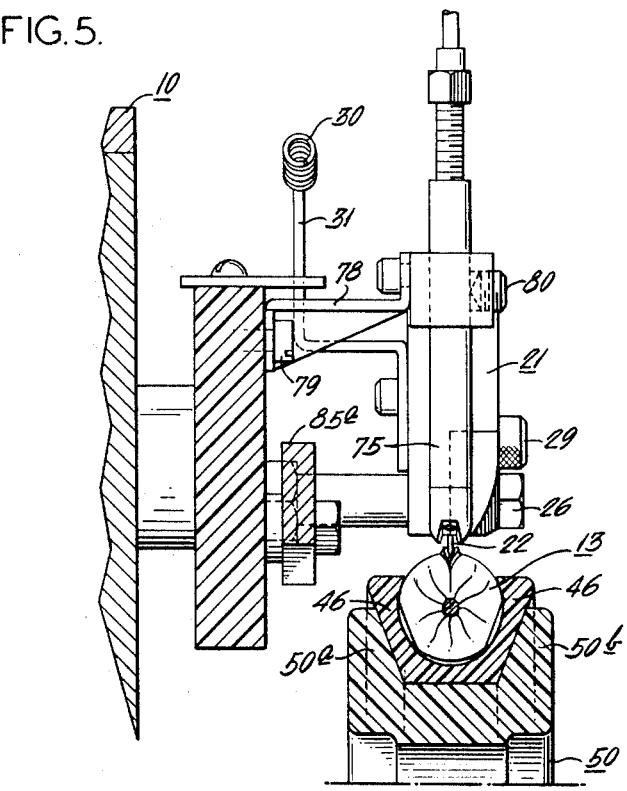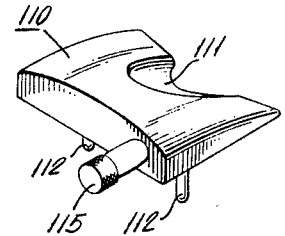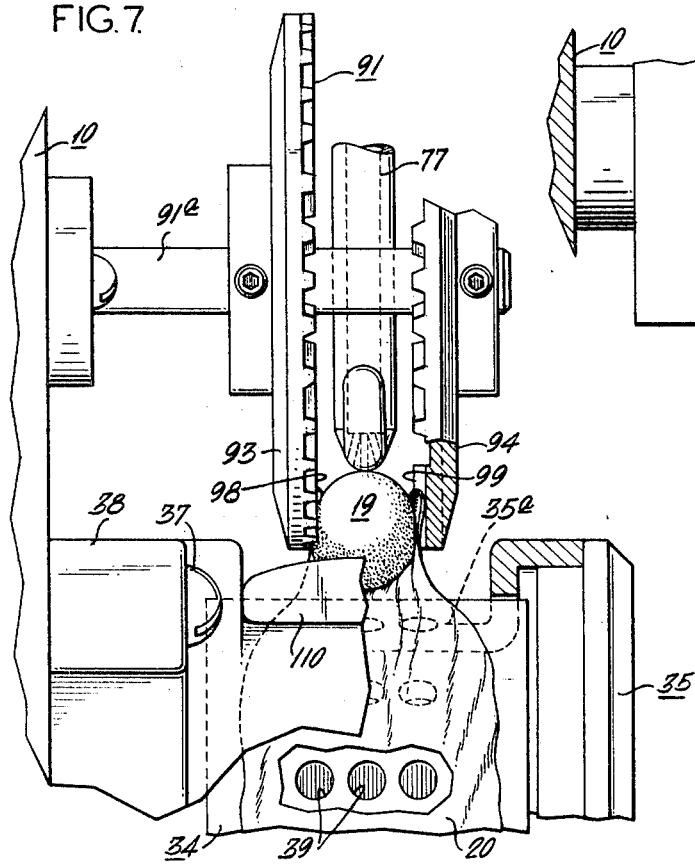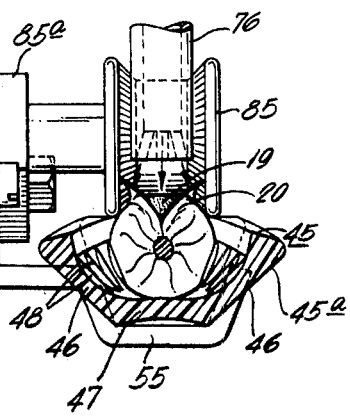

United States Patent Office 3,583,023
Patented June 8, 1971

---

3,583,023
APPARATUS FOR STRIPPING CASING FROM MINIATURE FRANKFURTERS
Wolf A. von Lersner, Cherry Hill, N.J., and Edgar F. Brown, Salisbury, Md., assignors to Campbell Soup Company, Camden, N.J.
Filed Jan. 7, 1969, Ser. No. 789,436
Int. Cl. A22c *13/00*
U.S. Cl. 17—1
12 Claims

ABSTRACT OF THE DISCLOSURE

Apparatus for stripping processing casings from a string of miniature frankfurters is provided with a knife which slits the casings longitudinally as the encased frankfurters advance therepast on a flexible belt having upstanding peripheral sidewalls which cooperate to grip the sides of the frankfurters therebetween. A series of nozzles spaced apart above the belt directs jets of air downwardly into the slits between the casings and the underlying frankfurter-bodies to partially separate the casings therefrom before the encased frankfurters advance across the top of a rotating wheel which vacuums the casings against its periphery to pull the casings downwardly as it rotates. Positive removal of the casings is ensured by a deflector mounted adjacent to the top of the stripping wheel in the path of the advancing frankfurters to displace the frankfurters away from the periphery of the wheel and the casings thereon.

---

The present invention relates to apparatus for stripping processing casings from sausages, frankfurters or the like, and more particularly, the present invention relates to new and useful improvements in apparatus for stripping the processing casings from relatively short or miniature frankfurters.

At present, machines are available for removing the processing casings from a continuous string of frankfurters. An example of this type of machine is illustrated in U.S. Pat. 3,023,452 in which a continuous string of sausages or frankfurters are slit longitudinally by a knife before they are transferred to a rotating stripping-wheel which operates by vacuum to engage the slit casings against its periphery for pulling them away from the sausages as the sausages are discharged from the machine. Although this machine operates satisfactorily to strip the processing casings from the conventional elongated sausages or frankfurters, it cannot strip the casings from relatively short frankfurters of the type which are presently being packaged in containers with other comestibles. In addition, before being processed in this machine, frankfurters must be heated to swell their casings in order to effect proper stripping.

In removing the casings from the small or miniature frankfurters, difficulties are caused by the lack of gripping surface on the miniature frankfurters and by the tendency of the frankfurters to rotate at random on their longitudinal axes when tension is transmitted through the twists between their ends in pulling a string of them past the slitting knife in a stripping machine. Thus, the slits in the casings are not consistently aligned properly with the vacuum-stripping-wheel, resulting in machine-jamming. In addition, when the miniature frankfurters are displaced rapidly past the knife, the slitting knife tends to miss the leading ends of the casings, so that as the frankfurthers advance across the vacuum-stripping-wheel, the casings tend to adhere to the leading ends of the frankfurters, thereby interfering with the proper stripping of the casings and interrupting the continuous operation of the stripping machine.

In view of the foregoing, it is a primary object of the present invention to provide novel apparatus for continuously stripping processing casings from a string of miniature frankfurters.

It is another object of the present invention to provide improved apparatus for separating the processing casings from miniature frankfurters in successive stages to promote the positive removal of the casings.

It is a further object of the present invention to provide novel means for positively gripping and advancing a string of miniature frankfurters past a slitting knife in a stripping machine.

It is a still further object of the present invention to obviate the necessity for preheating frankfurters before stripping the casings therefrom.

More specifically, in the present invention, a string of encased miniature frankfurters is advanced lengthwise under a slitting knife by means of a flexible belt having upstanding peripheral sidewalls which grip the frankfurters along their sides. The belt is flexed to open the sidewalls for both loading and unloading the frankfurters, the flexing being effected as the belt passes around idler pulleys when the belt is properly tensioned. After the casings are slit longitudinally, they are partially separated from the internal frankfurter-bodies by means of a series of nozzles disposed above the belt in the path of movement of the frankfurters to direct jets of air into the slits and between the casings and the frankfurter-bodies. Complete removal of the casings is effected by a rotating stripping-wheel which applies vacuum to the casings to engage them against its periphery while deflector means is provided in the path of the advancing frankfurters forward of the stripping-wheel to accelerate the frankfurter-bodies away from the periphery of the wheel for effecting positive removal of the casings.

In addition to the foregoing objects, other objects, features and advantages of the present invention will become apparent from the following description when taken in conjunction with the accompanying drawings in which:

FIG. 4 is an enlarged fragmentary view of the stripping apparatus of FIG. 1 having portions broken away and sectioned to illustrate a string of frankfurters disposed on a gripping-belt and extending under a slitting knife past a series of nozzles, over a stripping-wheel, and against deflector means;

FIG. 5 is a sectional view taken along line 5—5 of FIG. 4 to illustrate the knife slitting a frankfurter-casing as the encased frankfurter advances thereunder while being gripped between the sidewalls of the gripping-belt;

FIG. 6 is a sectional view taken along line 6—6 of FIG. 4 to illustrate one of the nozzles partially separating a casing from a frankfurter with the sidewalls of the gripping-belt beginning to open in the foreground to unload the frankfurter therefrom;

FIG. 7 is a sectional view taken along line 7—7 of FIG. 4 with portions of the stripping-wheel-housing broken away to illustrate a frankfurter-casing engaging the periphery of the stripping-wheel as the casing is stripped downwardly from the body of the frankfurter;

FIG. 8 is a perspective view of the deflector means which is provided adjacent to the stripping-wheel for accelerating frankfurters away from the periphery of the wheel; and FIG. 9 (sheet 2) is a fragmentary perspective view in transverse section of the gripping-belt which advances the frankfurters.

Figure 1:
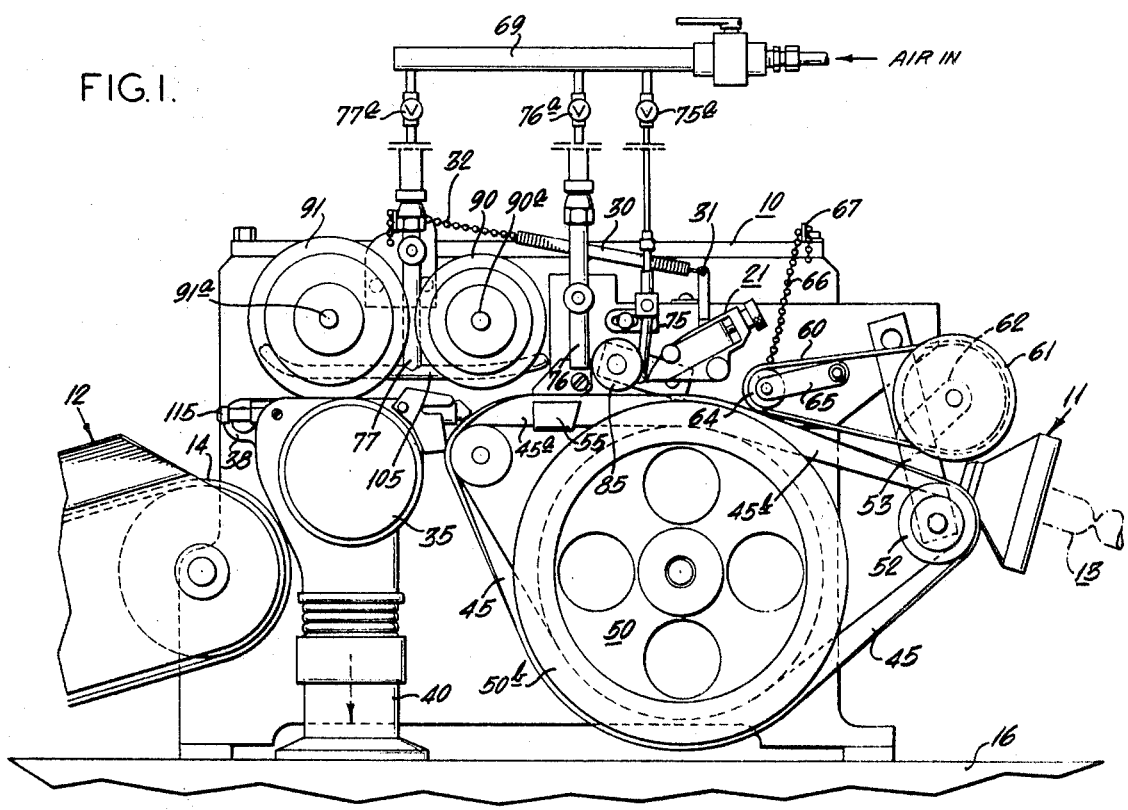
FIG. 1 is a side elevational view of casing-stripping-apparatus embodying the present invention.

Referring now to the drawings, and more particularly to FIG. 1, there is illustrated casing-stripping apparatus having a frame 10 mounted at a convenient working elevation on a cabinet 16 and having a loading station 11 and an unloading station 12. A string of encased frankfurters 13, each frankfurter having a body 19 and a casing 20 (see FIGS. 4, 5, and 6), is advanced leftward or forwardly through the apparatus from the loading station 11 to the unloading station 12. After the casings are stripped from the frankfurter-bodies, the frankfurters are transported leftward away from the apparatus by an independently driven conveyor 14 provided at the unloading station 12.

In order to strip the processing casings from the frankfurters as they advance through the apparatus, a lightweight knife 21 (FIGS. 1 and 4) first slits the casings longitudinally along their upper sides. In the present instance, the knife 21 declines forwardly and downwardly and overlies the path of movement of the frankfurters adjacent to the loading station and comprises a blade 22 mounted on lugs 23, 23 of a fixture 24 which telescopes in a holder 25 journaled to the frame 10 by a bolt 26. In the present instance, the holder 25 is made of lightweight metal such as aluminum and is balanced on the bolt 26 with the knife blade 22 being biased counterclockwise into engagement with the advancing frankfurter-casings 20 by a conventional extension spring 30 extending leftward from an arm 31 which projects upwardly from the holder 25. The tension in the spring 30 may be adjusted by a bead chain 32 connected to the spring and engaging a keeper 33 mounted on the frame 10 remote from the knife 21. The depth of engagement between the blade 22 and the casings 20 is adjusted by means of a knurled operator 27 connecting the holder 25 and the fixture 24 so that rotation of the operator 27 in opposite directions displaces the blade fixture 24 into and out of the holder 25. Access to the blade 22 for cleaning and replacement purposes is provided by a door 28 hinged to the holder 25 and secured by a suitable latch 29. Thus, with this knife arrangement, the cutting depth and pressure may be adjusted so that the blade slits only the casings without scoring the underlying bodies of the frankfurters and marring their appearance. Furthermore, the lightweight construction of the knife reduces its mass and thereby minimizes the inertial forces thereon, so that the knife may closely follow the contours of the frankfurters to properly slit their casings.

After the casings are slit by the knife, they are stripped from the frankfurter-bodies as they are pressed by vacuum against a peripheral segment of a rotating stripping-wheel 34 (see FIGS. 4, 7). In the present instance, the stripping-wheel 34 underlies the path of the advancing frankfurters and is mounted for rotation in a housing 35 located adjacent to the unloading station 12 and secured to the frame 10 by bolts 37, 37 passing through ears 38, 38. The stripping-wheel 34 projects a slight distance upwardly beyond the housing 35 through an aperture 36 in the upper wall 35a of the housing to engage the frankfurter-casings on the sides opposite to their slits, in the present instance along their bottom sides, the casings are stripped from the frankfurter-bodies 19, 19 as the casings 20, 20 are drawn or pressed against the periphery of the rotating stripping-wheel 34 by vacuum applied thereto through a series of spaced peripheral ports 39, 39. Operating vacuum is continuously admitted to the ports 39, 39 from the interior of the housing 35 which is maintained under vacuum through a tube 40 connected to a suitable source of vacuum. In addition to supplying vacuum, the tube 40 is sized to pneumatically convey the stripped casings away from the stripping-wheel 34 to a remote storage location, in the present instance within the cabinet 16. Thus, when the stripping-wheel 34 rotates in the counterclockwise direction as indicated in FIG. 4, and vacuum is applied in the housing 35, the processing casings are pulled downwardly through the aperture 36, into the housing 35, and are conveyed to a storage location in a continuous manner.

The processing casings are properly stripped from the frankfurters when the longitudinal slits in the casings are in the plane of rotation of the vacuum-stripping-wheel with the slits disposed away from the periphery of the wheel. Heretofore, alignment of the slits in this manner has presented problems because of the tendency of the miniature frankfurters to rotate randomly on their longitudinal axes when tension is applied to the frankfurters in pulling them past the slitting knife in a stripping machine. In accordance with the primary object of the present invention, means is provided to advance a string of encased frankfurters longitudinally while maintaining the slits in the casings properly oriented with respect to the vacuum-stripping-wheel in a stripping apparatus.

Figure 3:
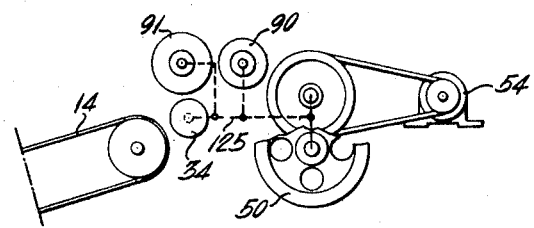
FIG. 3 is a schematic diagram of the synchronized drive arrangement employed in the present invention.

To this end, the frankfurters are gripped along their sides by a flexible gripping-belt 45 extending forwardly and rearwardly in a circuit under the knife 21 from the loading station 11 to the stripping-wheel 34, the belt 45 having a lefthand run 45a between the knife and the stripping mechanism which returns on a flat idler pulley 51 journaled to the machine 10 rearwardly of the stripping-wheel 34 and a righthand run 45b between the loading station and the knife which returns on a concave idler pulley 52 provided at the loading station 11 (see FIG. 1). In the present instance, the belt 45 is V-shaped having a pair of normally upstanding sidewalls 46, 46 which are reinforced by a series of spaced ribs 48, 48, the sidewalls cooperating with a bottom wall 47 to define a peripheral groove 49 for receiving frankfurters end-to-end (see FIG. 9). The belt 45 is driven in the counterclockwise direction to advance frankfurters leftward in its upper run as indicated in FIG. 1 by a drive pulley 50 mounted on the frame 10 below the slitting knife 21, its lower run returning rightward under the drive pulley 50 to the loading station. As may be seen in FIG. 3, the drive pulley 50 is rotated by an electric motor 54 which synchronizes the pulley 50 with the stripping-wheel 34 through suitable geared drive means 125. The concavity of the idler pulley 52 cooperates with the drive pulley 50 to ensure proper tracking of the gripping-belt under the knife.

In the present invention, the sidewalls of the gripping-belt are displaced laterally to effect smooth engagement and disengagement between the frankfurters and the belt when loading and unloading frankfurters therefrom. To this end, the flat or slightly concave surfaces of the pulleys 51 and 52 cause the belt 45 to flatten or flex as it passes around either of the idler pulleys 51 and 52 to open the sidewalls with the proper sidewall opening depending on the tension in the belt. In the present instance, the belt 45 is tensioned when an arm 53 (FIG. 1) depending from the frame 10 and mounting the idler pulley 52 at its lower end is displaced toward and away from the drive pulley 50. Thus, when the belt is properly tensioned upon displacement of the arm 53, the frankfurters are fully disengaged from the sidewalls when the sidewalls 46, 46 tend to flatten or become coplanar with the bottom wall 47 as the belt passes around either of the idler pulleys 51 and 52 (see FIGS. 1 and 4). The frankfurters are fully engaged against the sidewalls, however, as the distance from the idler pulleys increases along the belt, since at these locations the sidewalls 46, 46 tend to resume their normally upstanding positions to grip the sides of the frankfurters for advancing them leftward past the knife 21. While the frankfurters are being slit, they are firmly gripped between the sidewalls 46, 46 as the gripping-belt 45 passes around the top of the drive pulley 50, the sidewalls being urged together by peripheral flanges 50a and 50b on the drive pulley 50 (FIG. 5). After the frankfurters are slit, additional lateral support is provided for the sidewalls by a U-shaped belt-guide 55 (FIG. 6) bolted to the frame 10 and engaging along the outer margins of the sidewalls. The belt-guide 55 thereby prevents the belt from losing its grip on the frankfurters to obviate rotation of the frankfurters on their axes before they are transferred from the belt to the vacuum-stripping-wheel 34. In this manner, the frankfurters are positively gripped along their sides by the sidewalls of the gripping-belt as they advance through the apparatus while the longitudinal slit in each casing is maintained in proper alignment with the stripping-wheel 34.

Figure 2:
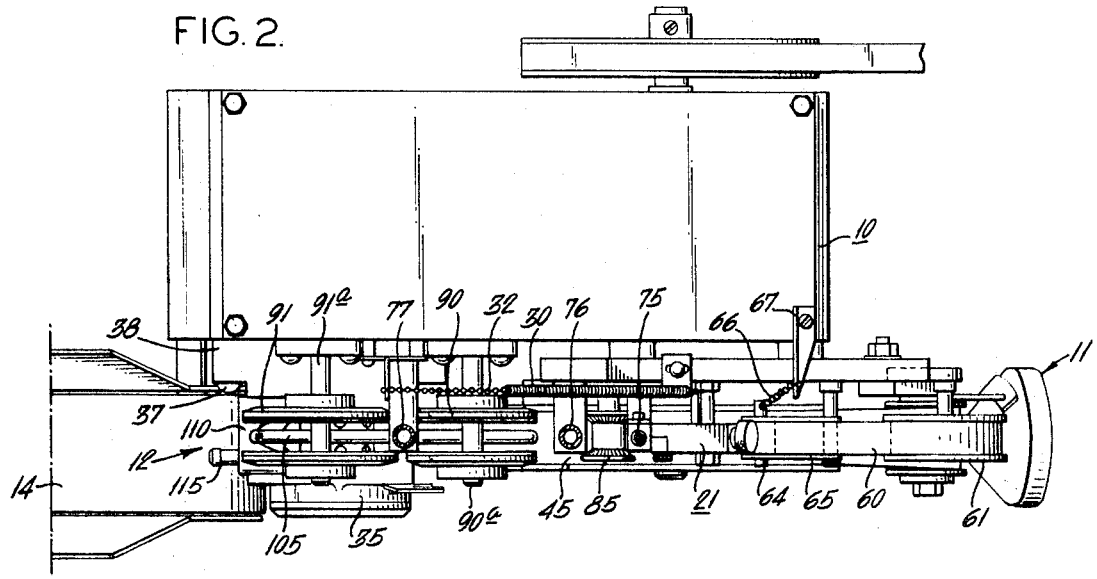
FIG. 2 is a top plan view of the stripping apparatus of FIG. 1.

In order to load the string of frankfurters onto the gripping-belt 45 and firmly engage them against the bottom wall 47, a flat idler-belt 60 (FIGS. 1, 2, 3) is provided adjacent the loading station 11 and overlies the righthand run 45b of the belt 45 for engaging along the upper sides of the frankfurters. As may be seen in FIG. 1, the idler-belt 60 is stretched between two pulleys, a pulley 61 journaled on an upwardly projecting arm 62 carried by the gripping-belt adjusting-arm 53, and a pulley 64 journaled on an adjusting-arm 65 pivoted to the frame 10 at a location offset from the centerline between the pulleys 61 and 64. The tension in the idler-belt 60 is adjusted by means of a bead chain 66 securely connected at one end to the adjusting-arm 65 and releasably connected at its other end to a keeper 67 on the frame 10. Thus, when the arm 65 is displaced upwardly, the tension is increased, and when the arm 65 is displaced downwardly, the tension is decreased. In the present invention, it is preferable for the idler-belt 60 to be positioned so that it engages against the upper margins of the gripping-belt-sidewalls 46, 46 adjacent to the drive pulley 50 in the absence of frankfurters on the gripping-belt 45. In this manner, the idler-belt 60 is driven clockwise in response to translation of the gripping-belt, so that when an operator inserts the lead frankfurter in a string of frankfurters between the belts through a funnel 70, the belts cooperate to pull the lead frankfurter and the following string of frankfurters leftward therebetween. The belt 60 extends along the run 45b a sufficient distance beyond the idler pulley 52 to insure gripping of the sides of the frankfurters by the sidewalls 46.

As noted thus far, the frankfurters are advanced lengthwise under the slitting knife 21 which slits the leading ends and the upper sides of the casings, and the vacuum-stripping-wheel 34 engages the lower sides of the encased frankfurters to pull the slit casings downwardly away from the frankfurter bodies. When the frankfurters are advanced past the slitting knife at high velocities, however, inertial forces on the slitting knife 21 may cause the knife-blade 22 to miss the leading ends of the frankfurters, thereby slitting only the upper sides of the casings. This would prevent the leading ends of the casings from being properly stripped from the bodies of the frankfurters, causing the machine to periodically jam and thereby interrupting production continuity. Therefore, in accordance with the present invention, means is provided forward of the slitting knife to direct jets of air into the slit casings for partially separating the casings in stages prior to their complete removal by the vacuum-stripping-wheel.

To this end, a series of nozzles 75, 76, and 77 are spaced apart along the path of movement of the frankfurters to overlie the frankfurters in alignment with the longitudinal slits in their casings (see FIGS. 1, 4, and 5). In the present instance, the nozzle 75 is mounted forwardly adjacent to the slitting knife 21 on a bracket 78 having adjusting screws 79 and 80 which permit the nozzle 75 to be adjusted vertically and horizontally. The nozzle 75 directs a jet of air, in the present instance filtered air, forwardly and downwardly against the inside of the leading ends of the casings 20, 20 as may be seen in FIG. 4 to thereby partially separate the leading ends of the casings from the leading ends of the frankfurter-bodies 19, 19. Further separation of the casings from the frankfurter-bodies is effected by the nozzle 76 spaced forwardly of the nozzle 75 and mounted for vertical adjustment on the frame 10 by means of a bracket 81 and a set screw 82. As may be seen in FIG. 6, the nozzle 76 directs jets of air downwardly and outwardly along the upper sides of the frankfurters to separate the casings from the upper sides of the frankfurter-bodies. The frankfurters are steadied as they are being subjected to the air jets from the nozzles 75 and 76 by means of a follower wheel 85 (FIGS. 1 and 4) disposed above the belt 45 between the nozzles 75 and 76 and carried by an arm 85a mounted on the frame 10. The wheel 85 engages along the upper sides of the frankfurters to prevent the frankfurters from being lifted out from between the sidewalls 46 of the transfer-belt 45 by the air issuing from the nozzle 75 particularly when the gripping-belt is stopped. In addition, the wheel 85 tends to prevent the leading ends of irregularly sized frankfurters from being displaced upwardly as they are disengaged from the gripping-belt.

A final jet of air is directed between the casings and the frankfurter-bodies by the nozzle 77 which is mounted rearwardly above the stripping-wheel 34 by a bracket 100 having a set screw 101 permitting vertical adjustment of the nozzle. Air is supplied to the nozzles from a common header 69 connected to a suitable source of compressed air, the air supply to each nozzle being regulated by valves 75a, 76a and 77a (FIG. 1) connected intermediate their respective nozzles and the air-supply header 69. Thus, with this nozzle arrangement, the jets of air cooperate to partially separate the casings from the frankfurter-bodies 19, 19 in successive stages as the frankfurters advance therepast to promote positive removal of the casings by the stripping-wheel.

The partially stripped frankfurters are disengaged from the gripping-belt 45 and are advanced over the stripping-wheel 34 by two transfer wheels 90 and 91 (FIG. 1) which rotate on horizontal shafts 90a and 91a spaced apart above and normal to the path of the advancing frankfurters on opposite sides of the final air nozzle 77. Each transfer wheel, as shown in FIGS. 4 and 7, comprises a pair of discs 93 and 94 having a series of confronting teeth 98, 98 and 99, 99 spaced apart around their respective peripheries to engage the frankfurter-casings. In the present instance, the transfer wheels 90 and 91 are each driven at a tangential velocity which is slightly greater than the linear velocity of the gripping-belt 45, so that the teeth on the transfer wheels frictionally engage opposite sides of the casings to advance the frankfurters forwardly across the stripping-wheel from the gripping-belt. In the present instance, the rotation of the transfer wheels 90 and 91 is synchronized with the rotation of the stripping-wheel 34 and the drive pulley 50 by the geared drive means 125 (see FIG. 3). As may be seen in FIG. 4, the frankfurters are prevented from being lifted upwardly between the discs of the rotating transfer wheels 90 and 91 by a bar 105 which projects forwardly and rearwardly from the nozzle 77 between the discs. In this manner, the transfer wheels cooperate with the gripping-belt to maintain the slit casings properly aligned with the stripping-wheel for positively stripping the casings from the advancing frankfurters.

In order to effect uninterrupted stripping of casings from the frankfurter-bodies, deflector means is provided forwardly of the vacuum-stripping-wheel to accelerate the frankfurters upwardly away from the periphery of the stripping-wheel 34 as the frankfurters advance thereacross. To this end, a cam plate 110 (see FIGS. 4 and 8) having a curved camming surface 111 tapering rearwardly and downwardly toward the periphery of the stripping-wheel 34 is disposed in the path of the advancing frankfurters. The camplate is removably mounted on the upper wall 35a of the housing 35 forwardly adjacent to the periphery of the stripping-wheel 34, the cam plate 110 being positioned on the wheel-housing 35 by a pair of dowels 112, 112 engaging in bores in the upper housing-wall 35a. Removal of the plate 110 for cleaning and replacement purposes is facilitated by a handle 115 projecting forwardly from the plate. As may be seen in FIG. 4, the bar 105 is inclined sharply upward above the cam 110 to provide adequate clearance for frankfurters to pass therebetween. In this manner, frankfurters advancing leftward across the stripping-wheel 34 strike the cam plate 110 and are deflected upwardly by the camming surface 111 to accelerate the frankfurter-bodies 19, 19 and their casings 20, 20 away from the stripping-wheel for effecting positive and complete removal of the casings therefrom.

In operation, the valves 75a, 76a and 77a are manipulated to adjust the supply of compressed air to the nozzles 75, 76 and 77 respectively. The electric motor 54 and machine drive 125 are energized, and the gripping-belt 45, the idler-belt 60, the vacuum-stripping-wheel 34, and the husking wheels 90 and 91 are driven in the directions indicated in FIG. 4. An operator may then insert the lead frankfurter of a string of frankfurters through the funnel 70 to thereby load the frankfurters onto the gripping-belt. As the frankfurters are advanced leftward by the gripping-belt, their casings are each slit longitudinally along their upper sides as they pass under the slitting knife 21. After the casings are slit, the gripping-belt advances the frankfurters further leftward past the nozzles 75, 76 and 77 where a succession of air jets directed into the slits against the bodies of the frankfurters partially separate the casings therefrom. The frankfurters are then transferred from the gripping-belt by the transfer wheels 90 and 91 which also cooperate to advance the frankfurters over the vacuum-stripping-wheel. The casings are completely removed from the frankfurter-bodies as the bodies are deflected upwardly upon striking the cam plate 110 while the vacuum-stripping-wheel 34 simultaneously pulls the casings downwardly. The stripped casings are then pneumatically conveyed through the tube 40 to a remote storage location in the cabinet 16.

Thus, in view of the foregoing, it may be seen that novel apparatus has now been provided for positively removing the casings from the bodies of miniature frankfurters in a continuous process with a minimum loss in production due to machine-jamming.

While a preferred embodiment of the present invention has been described in detail, various modifications, alterations or changes may be made without departing from the spirit and scope of the present invention as defined in the appended claims.

What is claimed is:

1. In apparatus for stripping processing casings from frankfurters having encased bodies connected together in end-to-end and relationship in a string, the apparatus having a knife for longitudinally slitting the casings as the frankfurters advance forwardly therepast and stripping means engaging the casings to pull the casing away from the bodies, the improvement comprising: advancing means including a flexible gripping-belt extending forwardly and rearwardly under said knife in a circuit having a forward terminus adjacent said stripping means, said gripping-belt having a pair of peripheral sidewalls biased into normally upstanding configuration for gripping the sides of the encased frankfurters to advance the frankfurters longitudinally past the slitting knife, means for driving the gripping-belt, separating means spaced forwardly of the knife along the path of movement of the frankfurters for partially separating the casings in stages from the bodies as the frankfurters advance, means for flattening said gripping-belt to displace the said sidewalls outwardly against their bias for loading said frankfurters onto said belt rearwardly of said knife and again for unloading said frankfurters therefrom adjacent to said stripping means, whereby the encased frankfurters are gripped along their sides as they advance longitudinally under the slitting knife to thereby prevent the encased frankfurters from rotating on their longitudinal axes, and deflector means provided forward of the stripping means in said path of travel of said frankfurters to accelerate the frankfurter bodies upwardly away from the stripping means, whereby the processing casings are positively stripped from the encased frankfurters as they advance through the apparatus.

2. Apparatus in accordance with claim 1 including a loading station and wherein said gripping-belt has a truncated V-shaped cross-section, said driving means comprises a drive pulley mounted on said frame below said knife and having peripheral flanges engaging against said sidewalls for laterally supporting said sidewalls as the frankfurters are being slit by the knife, a first idler pulley journaled to said frame rearwardly of said stripping means to dispose said gripping-belt in a first run between said drive pulley and said stripping means, a second idler pulley disposed rearwardly of said drive pulley to dispose said gripping-belt in a second run between said loading station and said drive pulley and mounted for displacement toward and away from said drive pulley, whereby upon rotation of said drive pulley the drive pulley cooperates with the idler pulleys to control the flexure of the sidewalls of the gripping-belt to ensure smooth loading and unloading of encased frankfurters therein and therefrom.

3. Apparatus in accordance with claim 2 wherein said second idler pulley is journaled on an arm to incline said gripping-belt upwardly in said second run, and a flat idler-belt overlies said upwardly inclined portion of the gripping-belt and extends therealong intermediate said second idler pulley and said drive pulley to engage against the upper sides of the frankfurters when they are disposed between the sidewalls of the gripping-belt, said idler-belt engaging against said sidewalls for translation in response to the translation of the gripping-belt, whereby the idler-belt cooperates with the gripping-belt to properly seat the frankfurters between the sidewalls thereof.

4. Apparatus in accordance with claim 1 wherein said separating means comprises a first nozzle mounted forward of the knife for directing a jet of air forwardly and downwardly into the slits and against the bodies of the frankfurters to partially separate the casings from the forward ends thereof, a second nozzle mounted forward of said first nozzle for directing a jet of air downwardly into the slits and along the sides of the frankfurters to partially separate the casings therefrom, and a third nozzle mounted forward of said second nozzle and adjacent to said stripping means for directing a jet of air downwardly against the bodies of the frankfurters to further separate the casings therefrom, whereby the casings are partially stripped from the frankfurters in successive stages preparatory to complete stripping by the stripping means to thereby effect positive removal of the casings.

5. Apparatus in accordance with claim 4 wherein said apparatus has a follower wheel disposed between said first and second nozzles for engaging against the upper sides of the advancing frankfurters to steady the frankfurters while they are being subjected to the jets of air issuing from said first and second nozzles, and a U-shaped belt guide is disposed forwardly of said second nozzle to engage the sidewalls of said gripping-belt for maintaining the sidewalls in engagement with the frankfurters carried therebetween, whereby the frankfurters are positively gripped along their sides after they are slit and while they are being subjected to the jets of air issuing from the nozzles.

6. Apparatus in accordance with claim 1 wherein said stripping means comprises a wheel mounted for rotation in a housing having an upper wall with an aperture therein in registry with the periphery of said stripping-wheel, and said deflector means comprises a camming plate mounted on said upper wall forward of said stripping-wheel in the path of movement of said frankfurters, said camming plate having a surface tapering rearwardly and downwardly toward the periphery of said stripping-wheel, whereby the frankfurters are accelerated upwardly away from the stripping wheel as the casings are pulled downwardly thereagainst to effect positive removal of the casings.

7. In apparatus for stripping casings from frankfurters having encased bodies connected together in end-to-end relationship as a string including a slitting station to slit the casings and a stripping station to strip the slit casings from the frankfurters, and means to advance the string forwardly through the apparatus from a loading station to an unloading station, the improvement comprising: a gripping-belt extending forwardly and rearwardly in a circuit having upper and lower runs disposed intermediate said loading and unloading stations, said gripping-belt having a pair of normally upstanding peripheral sidewalls defining a groove therebetween for receiving a plurality of frankfurters in end-to-end relationship in said upper run with said sidewalls cooperating to firmly grip said frankfurters therebetween, means to drive said gripping-belt for translating said upper run forwardly from said loading station, and means for flattening said gripping-belt to displace said sidewalls out of their normally upstanding positions to widen said groove at said loading station for loading said string of frankfurters onto said belt and again widen said groove at a point intermediate said slitting station and said stripping station for unloading said frankfurters therefrom, whereby the gripping-belt firmly grips the frankfurters to prevent them from rotating randomly on their longitudinal axes as they are advanced through the apparatus.

8. Apparatus according to claim 7 wherein said apparatus has a frame, said gripping-belt has a truncated V-shaped transverse cross-section with a series of reinforcing ribs spaced apart in said sidewalls along the length of said belt to bias said sidewalls into a normally upright configuration, and said means to flatten said transfer-belt comprises a first idler pulley mounted adjacent to said loading station to engage the inner periphery of said gripping-belt and a second idler pulley mounted adjacent to said unloading station to engage the inner periphery of said gripping-belt, one of said idler pulleys being journaled on an arm secured to said frame for displacement toward and away from the other of said idler pulleys to adjust the tension in said gripping-belt, whereby the sidewalls of the gripping-belt are displaced into and out of engagement with the frankfurters to smoothly load and unload frankfurters therefrom.

9. Apparatus in accordance with claim 8 wherein said gripping-belt drive means comprises a drive pulley mounted for rotation on said frame intermediate said idler pulleys, said drive pulley having a pair of peripheral flanges engaging said upper run therebetween along an upper peripheral segment thereof to translate said upper run forwardly upon rotation of said drive pulley, whereby the flanges cooperate to displace the sidewalls inwardly against the sides of the frankfurters as the frankfurters are advanced forwardly over the drive pulley in said upper run.

10. Apparatus according to claim 9 wherein said first idler pulley is mounted to upwardly incline said upper run between said first idler pulley and said drive pulley, and an idler belt overlies said upwardly inclined run and engages said sidewalls for translation in response to the translation of said gripping-belt, said idler belt being substantially flat and extending across the width of said groove in said gripping-belt, whereby the idler belt cooperates with the gripping-belt to properly seat the frankfurters in the groove.

11. Apparatus in accordance with claim 10 wherein said idler-belt is carried by a pair of flat pulleys spaced apart above and along said upwardly inclined portion of the gripping-belt, one of said pulleys being disposed adjacent to said drive pulley and being journaled on an arm pivoted to the frame at a location offset from the centerline between the axes of rotation of the flat pulleys and intermediate said axes, whereby upon displacement of said arm and said journaled pulley toward and away from the centerline, the position of the idler-belt may be adjusted to properly seat the frankfurters on the gripping-belt.

12. Apparatus in accordance with claim 9 including means overlying said gripping-belt forwardly of said drive pulley to operate on said frankfurters and a belt-guide mounted on said frame to engage laterally against the sidewalls of the gripping-belt adjacent to said operating means for maintaining the sidewalls in engagement with the frankfurters disposed therebetween, whereby the belt-guide cooperates with the drive pulley to steady the frankfurters while they are being subjected to the operating means.

References Cited
UNITED STATES PATENTS

| | | | |
|---|---|---|---|
| 2,644,979 | 7/1953 | Ball | 17—1 |
| 2,699,570 | 1/1955 | Chambers et al. | 17—1 |
| 3,055,045 | 9/1962 | Brendle et al. | 17—1 |
| 3,487,498 | 1/1970 | Grandon et al. | 17—1 |
| 3,487,499 | 1/1970 | Klyce | 17—1 |

LUCIE H. LAUDENSCHLAGER, Primary Examiner